May 6, 1947. G. ERIKSON ET AL 2,420,170
GRINDING MACHINE TOOL CARRIAGE CONTROL
Filed Oct. 2, 1942 6 Sheets-Sheet 1

Inventors
Gustaf Erikson
Eddie Christian Filstrup
By Spencer, Marzall, Johnston + Cook
Attys

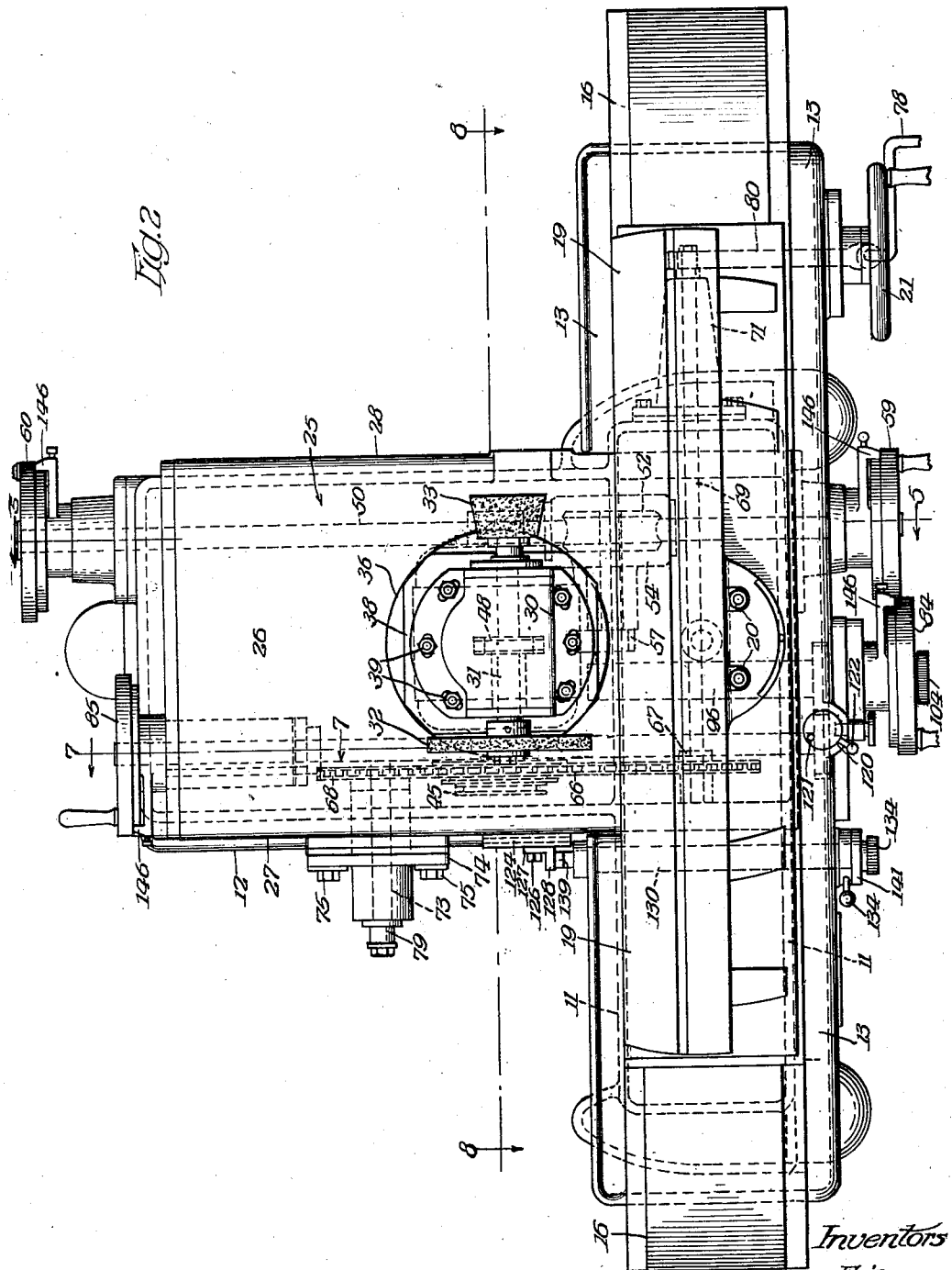

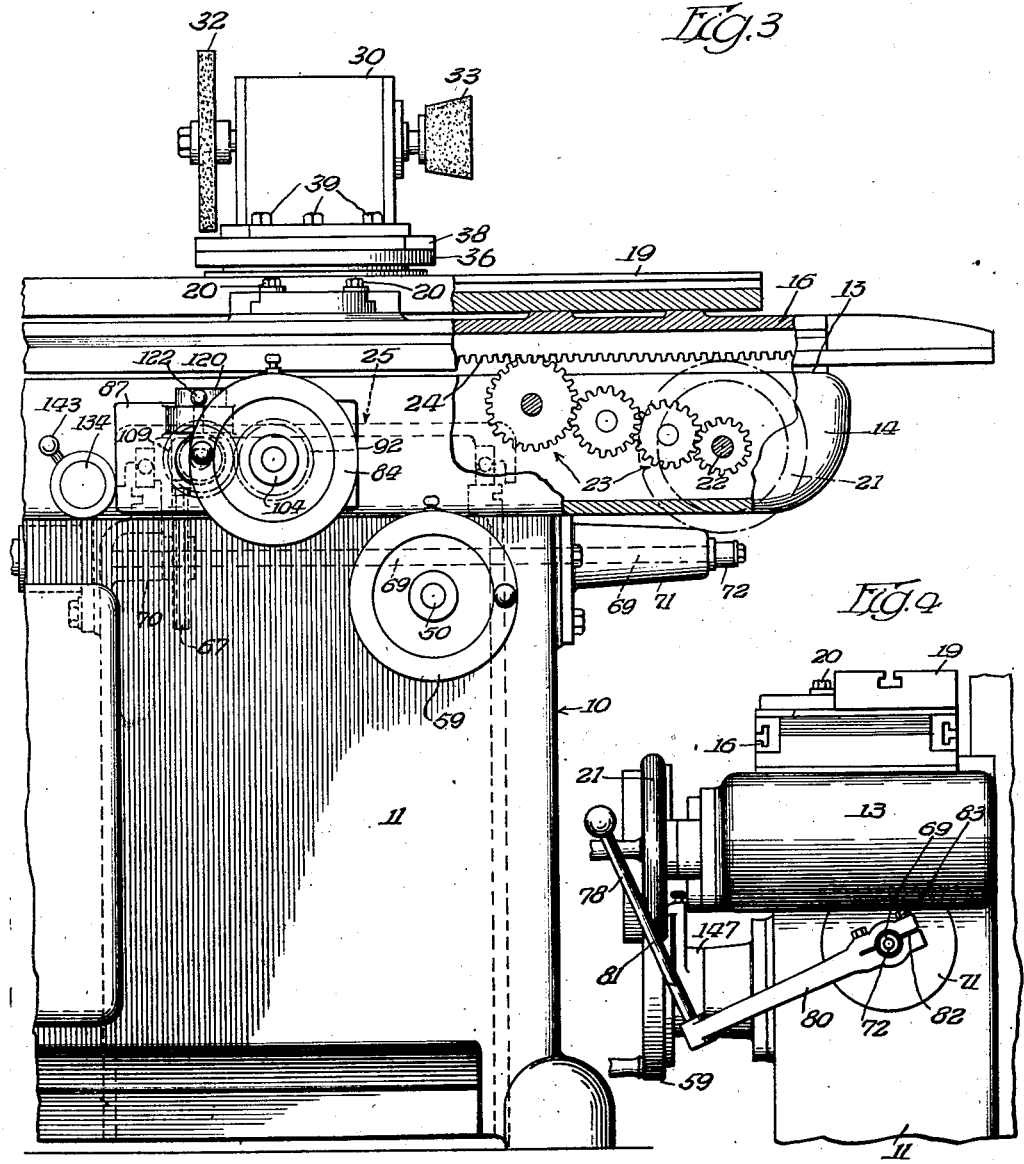

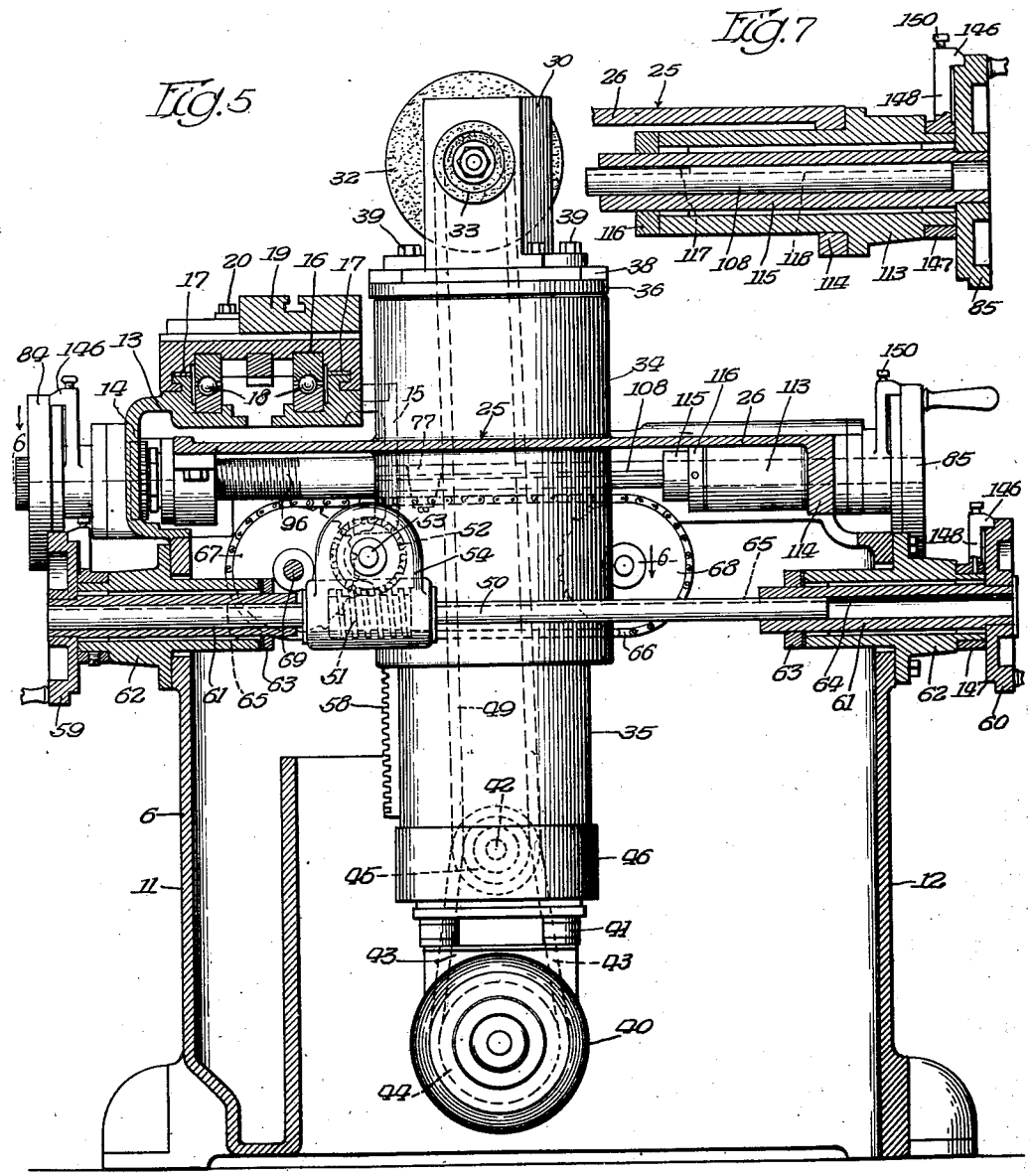

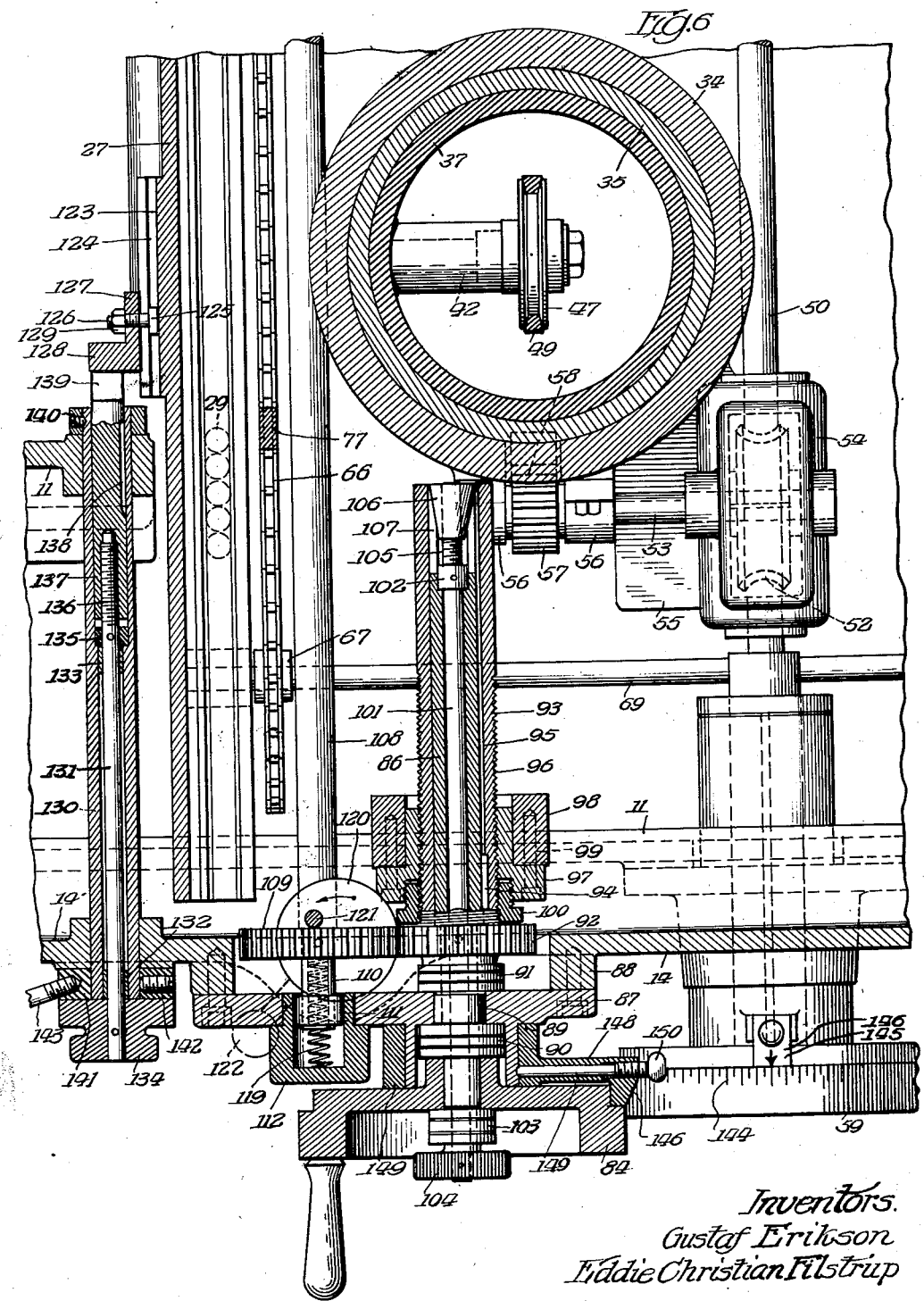

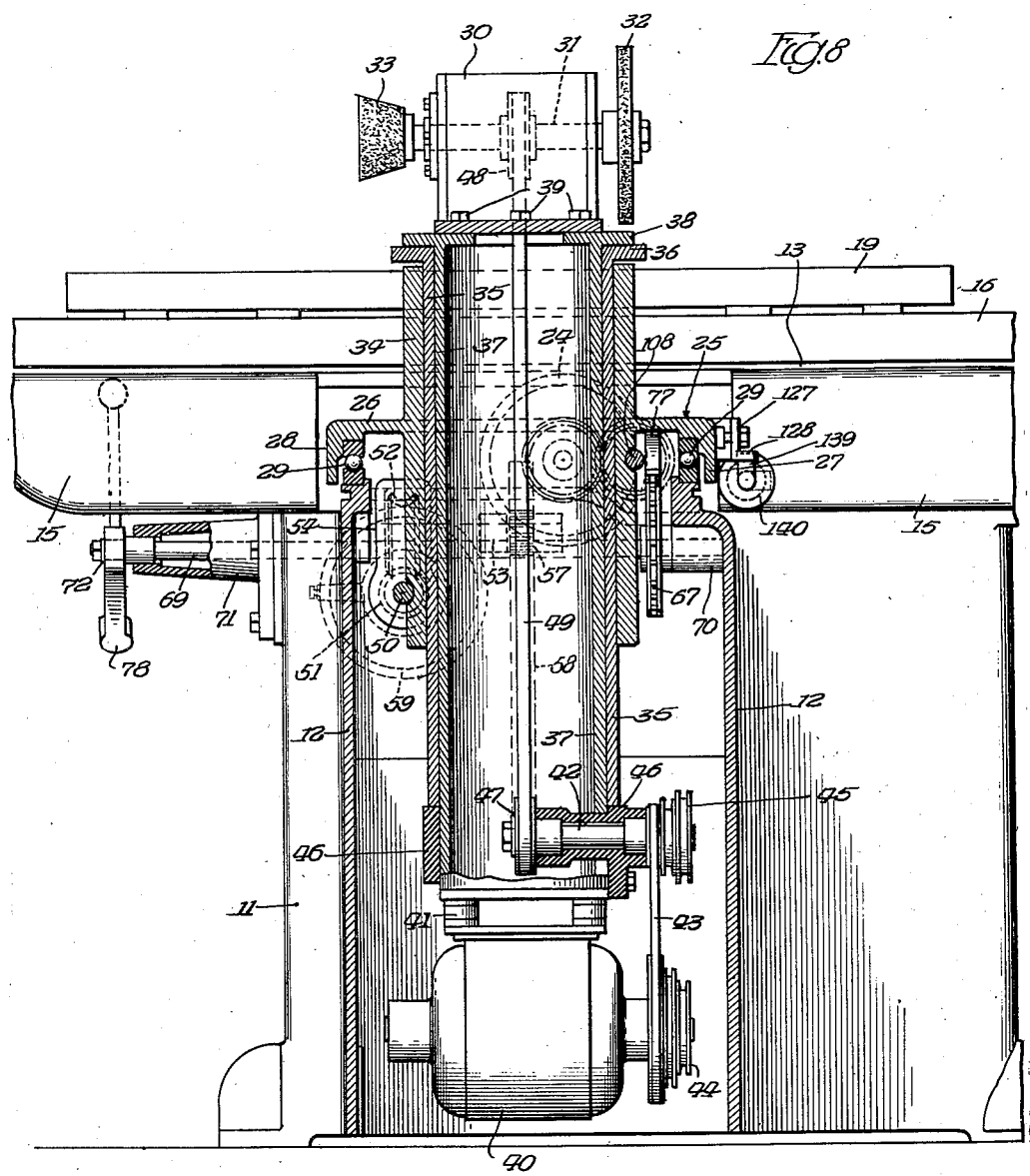

Patented May 6, 1947

2,420,170

UNITED STATES PATENT OFFICE 2,420,170

GRINDING MACHINE TOOL CARRIAGE CONTROL

Gustaf Erikson, Benton Harbor, and Eddie Christian Filstrup, St. Joseph, Mich., assignors to Covel Mfg. Co., Benton Harbor, Mich., a corporation of Michigan Application October 2, 1942, Serial No. 460,556

25 Claims. (Cl. 51—92)

This invention relates to machine tools and more particularly to a universal grinder for cutters, tools and other machine or like parts.

A primary object of the invention is the provision of an improved grinding machine adapted for universal adjustment and simple operation to effect any desired grinding operation on any desired work material and providing for either rapid or slow feeding movement of a grinding wheel head transversely of a reciprocal work supporting table.

A further object is the provision of a grinding machine in which a grinding wheel head may be fed either rapidly for slowly towards and away from a work table and the means for effecting slow feed is readily and simply detached from operable connection with the head to permit rapid feed of the head.

A further object is the provision of new, improved and relatively simple means for effecting either rapid or slow feeding movement of a tool support.

A still further object is the provision of new and improved means for imparting slow feeding movement to a tool support and for rendering the slow feed means inoperative when it is desired to effect rapid movement of the support and readily operative when it is desired to effect slow feeding movement.

Still another object is the provision of a slow speed feeding and adjusting mechanism for a tool support that is adapted to be rendered either operative or inoperative at any position along the path of feeding movement of the support.

A further object is the provision of a grinding machine in which a manually movable saddle carrying a tool support is rapidly moved transversely of a work table by merely throwing a hand lever in one direction or another.

A further object is the provision of a grinding machine having a simple drive means for effecting rapid movement of a tool carrying saddle and having an independent screw feed for effecting slow adjusting movement of the saddle, both said rapid drive means and said screw feed being conveniently operable from a plurality of different positions around the machine.

Another object is to provide an improved stop mechanism for limiting forward movement of a movable tool support, the stop being readily adjusted along the path of saddle movement and being simply moved to a released or inoperative position.

Numerous other objects and advantages will be apparent throughout the progress of the following specification.

The accompanying drawings illustrate a selected embodiment of the invention and the views therein are as follows:

Fig. 2 is a plan view of the complete machine;

Fig. 3 is a front elevation of a portion of the machine, the view being partly broken away and partly in section;

Fig. 4 is a fragmentary elevation of a portion of the machine at the right hand end and shows the lever for effecting rapid feed of the grinding wheel head;

Fig. 5 is a transverse vertical section taken on the line 5—5 of Fig. 2;

Fig. 6 is a horizontal section taken on the line 6—6 of Fig. 5;

Fig. 7 is a sectional detail taken on the line 7—7 of Fig. 2; and

Fig. 8 is a vertical section taken longitudinally of the machine on the line 8—8 of Fig. 2.

Figure 1:
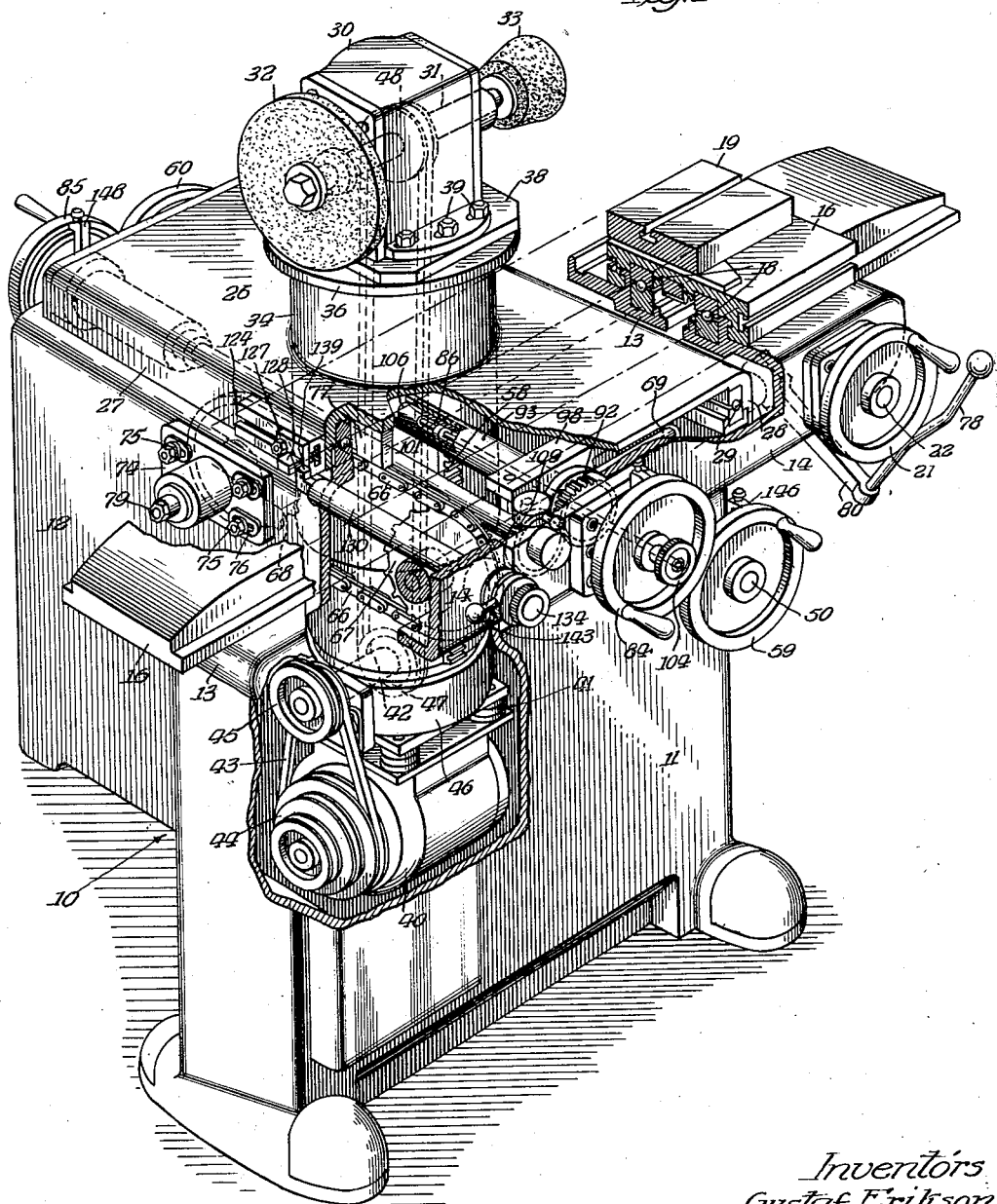
Fig. 1 is a perspective view of a grinding machine constructed in accordance with the present invention.

The particular machine herein described for illustrating the invention has a box-like frame 10 which is generally T-shaped and comprises a longitudinally extending forward portion 11 and a rearwardly extending portion 12. A stationary bed plate 13, having downwardly extending side flanges 14 and 15, Figs. 1, 3, 5 and 8, is carried by the longitudinally extending portion 11 of the frame and provides a support and guide for a reciprocal work table 16. The work table 16 is slidably attached to the bed plate 13, as indicated at 17, and suitable roller or ball bearings 18 may be provided between the bed plate and work table to assist in reciprocal movement of the table. A work holder 19 is mounted on the top of the table 16, as by means of the bolts 20, and is reciprocal therewith. The work holder 19 is adapted to carry suitable jigs or the like for supporting work material in any desired position on the work table.

Reciprocal movement of the work table 16 on the bed plate 13 is effected by any desired means. One such means is illustrated in the drawings and comprises a hand wheel 21, which is attached to a shaft 22 rotatably mounted on the side flange 14 of the bed plate 13 at the right-hand end of the machine, and provides for operating a train of gears designated generally by the reference numeral 23 in Fig. 3. The gear train 23 coacts with a rack 24 carried by the work table 16 to move the work table and the holder 19 thereon in one direction or the other in response to turning of the hand wheel 21.

A saddle 25, comprising a plate-like member 26 and side flanges 27 and 28, Figs. 1, 2, and 8, is mounted above the frame portions 11 and 12 for sliding movement transversely of the work table 16. The rear side flange 15 of the bed plate 13 is suitably cut away to permit the saddle 25 to slide under the bed plate, and ball bearings 29, mounted in suitable races on the saddle and frame, assist in the free sliding movement of the saddle. The saddle 25 carries a grinding wheel head 30 having a shaft 31 rotatably mounted therein. The shaft 31 is adapted to carry suitable grinding wheels, such as the wheels 32 and 33, for operating on the work material.

The head 30 is mounted on the saddle 25 by a means provided for vertical adjusting movement of the head, and also permitting rotation of the head about a vertical axis. To this end a cylindrical and vertically extending sleeve or bearing member 34 is attached to or formed integral with the top plate 26 of the saddle. A second cylindrical member or sleeve 35 is slidably mounted within the member 34 and is provided with a flange 36 at its upper end. A third cylindrical member or sleeve 37 is rotatably mounted within the second sleeve 35, and is provided with a flange 38 which overlies the flange 36 of the second sleeve, the flanges 36 and 38 providing a thrust bearing for rotatably supporting the third cylindrical member within the second. The grinding wheel head 30 is bolted to the flange 38, as indicated at 39, and is adapted to be rotated within the sleeve 35 and locked in adjusted position by any suitable means (not shown).

An electric motor 40 provides for driving the shaft 31 of the grinding wheel head and is attached by suitable supporting means 41 to the lower end of the cylindrical member 37. The motor 40 is operatively connected with a shaft 42 by means of a belt 43 engaging around stepped, change speed pulleys 44 and 45. The shaft 42 is rotatably mounted in a collar 46 attached to the inner cylindrical member 37 and forming a lower thrust bearing for the member 37. Pulleys 47 and 48 are attached to the shafts 42 and 31, respectively, and a belt 49 trained around these pulleys and extending upwardly through the hollow interior of the member 37 provides for rotating the grinding wheel shaft 31 under operation of the motor 40.

Vertical adjustment of the head 30 is effected by a shaft 50 which extends transversely of the machine beneath the saddle 25 and carries a worm 51 having meshing engagement with a worm wheel 52 attached to a shaft 53. The worm and wheel are mounted within a suitable housing 54 which is rigidly attached to the outer cylindrical member 34, as by a bracket 55, Fig. 6, and the shaft 53 is rotatably journaled in the housing 54 and in a pair of bearings 56, also attached to the cylindrical member 34. A pinion 57 is attached to the shaft 53 between the bearings 56 and has meshing engagement with an elongated rack 58 attached to the intermediate cylindrical member 35, the outer cylindrical member 34 being suitably recessed to permit engagement of the pinion with the rack. Thus, upon rotation of the transverse shaft 50, the pinion and rack 57—58 causes cylindrical member 35 to move upwardly or downwardly within the member 34 to effect vertical adjusting movement of the inner sleeve 37 and the head 30 carried thereby. Rotation of the transverse shaft 50 to cause vertical adjustment of the head 30 is effected by either of a pair of hand wheels 59 and 60 positioned at the front and back sides of the machine, respectively, and providing for vertically adjusting the head 30 from either the front or rear side of the machine. The hand wheels 59 and 60 are each attached to a sleeve 61 which is rotatably supported within bearings 62 mounted upon the front and rear walls of the frame portions 11 and 12. A collar 63, which is attached to each of the sleeves 61 by a set screw or the like, provides for maintaining the sleeves against axial movement within the bearings 62. The shaft 50 is slidably but non-rotatably connected with each of the sleeves 61 by means of a key 64 attached to the sleeve 61 and operating within an elongated keyway 65 provided in each end of the shaft 50. The shaft 50 is thus free to slide longitudinally of the sleeves 61 upon movement of the saddle 25 and head 30, but is caused to rotate upon rotation of either of the wheels 59 or 60 to effect vertical adjusting movement of the head 30 and the grinding wheels carried thereby.

The saddle 25 and the head 30 carried thereby are adapted to be given very rapid movement toward and away from the work table 16, and are also adapted to be given very slow movement to effect fine adjustment of the grinding wheels with respect to work material carried by the table 16. The means for effecting rapid travel of the saddle comprises a chain 66 which extends transversely of the machine beneath the saddle 25 and is trained over a pair of sprockets 67 and 68. The sprocket 67 is positioned adjacent the forward side of the machine and is attached to a longitudinally extending shaft 69, which is suitably mounted in bearings 70 and 71 attached to the machine frame, and projects outwardly from the bearing 71 at the right hand end of the frame portion 11, as indicated at 72, Figs. 3 and 8. The sprocket 68 is attached to a stub shaft 73, Fig. 2, rotatably mounted in a plate 74, Figs. 1 and 2, bolted by bolts 75 to the left hand side of the rearwardly extending frame portion 12. The bolts 75 extend through elongated slots 76 provided in the plate 74, whereby the sprocket 68 may be adjusted properly to tension the chain 66. The saddle 25 is operatively connected to the chain 66 by means of a lug 77, Figs. 3, 6 and 8, which extends downwardly from the top plate 26 of the saddle and is connected to one of the links of the upper reach of the chain 66. Thus, upon movement of the chain in either a forward or backward direction by rotation of the sprockets 67 and 68, the saddle 25 and head 30 are caused to move forwardly or rearwardly at a speed corresponding with the speed of movement of the chain. The chain 66 is given rapid movement in either a forward or rearward direction by means of a hand lever 78, Figs. 1, 4 and 8, which is adapted to be detachably connected either to the outwardly projecting end 72 of the shaft 69 at the right-hand end of the machine, or to an outwardly projecting portion 79 of the stub shaft 73 at the left end of the machine. Rapid movement of the saddle 25 and head 30 can thus be effected from either the right or left ends of the machine, depending upon which is the more convenient for the particular grinding operation being performed.

Referring to Fig. 4, the lever 78 is illustrated as comprising a crank arm 80 and an operating handle 81. Any suitable means, such as a split 82 at the inner end of the arm 80, and clamping bolts 83, may be provided for detachably connecting the lever 78 to either the shaft 69 or the shaft 73. A simple throw of the handle 81 either downwardly or upwardly causes the saddle 25 and the head 30 rapidly to move either forwardly or rearwardly.

The means for effecting slow adjusting movement of the saddle 25 and head 30 transversely of the work table 16 comprises a pair of hand wheels 84 and 85 which are positioned, respectively, at the forward and rear sides of the machine. These hand wheels, however, are selectively connectible and disconnectible with the saddle 25 either to feed the saddle forwardly or rearwardly at a slow speed when connected thereto, or to permit rapid movement of the saddle under operation of lever 78 when disconnected.

Referring more particularly to Figs. 1 and 6, a hollow sleeve 86 is rotatably mounted in a plate 87 attached to a forwardly extending flange 88 on the side wall 14 of the bed plate 13. The hand wheel 84 is pinned or otherwise attached to the sleeve 86, and the sleeve 86, while free to rotate in a bearing 89 in the plate 87, is maintained against axial movement by thrust bearings 90 and 91 positioned between the hand wheel 84, the plate 87, and a pinion 92 also attached to the sleeve 86. An outer sleeve 93 is slidably but non-rotatably mounted on the sleeve 86, a key 94, attached to the outer sleeve 93 and operating in a keyway 95 on the inner sleeve 86, providing for sliding movement of the outer sleeve while maintaining the outer sleeve against rotation with respect to the inner sleeve 86.

The outer sleeve 93 is provided with an external screw-threaded portion 96 which has threaded engagement with an internally threaded nut 97. The nut 97 is fixedly attached to the saddle 25 by means of a strap or yoke-like member 98, which is rigidly attached to the saddle 25 and extends downwardly therefrom. The nut 97 is bolted to the strap or yoke-like member 98, as indicated at 99, and is thus maintained against rotation with respect to both the inner and outer sleeves 86 and 93. A take-up nut 100, having threaded engagement with the nut 97 and the sleeve 93, may also be provided to take up backlash.

The sleeves 86 and 93 are adapted to be locked together or unlocked selectively to permit either slow or rapid movement of the saddle 25 and head 30 by means of a rod 101 which extends through the hollow bore of the inner sleeve 86 and is rotatably but non-slidably mounted therein by means of a collar 102 and a thrust bearing 103. The rod 101 extends outwardly of the hand wheel 84 and has an operating knob 104 pinned or otherwise attached thereto. The inner end of rod 101 is provided with a screw-threaded portion 105 which has threaded engagement with an internally threaded, tapered wedging member 106. The inner end of the sleeve 86 is suitably notched and cut away to provide a plurality of resilient, outwardly tapered fingers 107. The construction is such that upon turning the knob 104 in one direction, the wedge member 106 moves inwardly to wedge and lock the fingers 107 and the inner sleeve 86 to the outer sleeve 93, whereas turning the knob 104 in the opposite direction unlocks the sleeves 86 and 93.

Thus when the sleeves 86 and 93 are unlocked, the outer sleeve 93 is free to slide on the inner sleeve 86, and rapid movement of the saddle 25 and head 30 may be effected by lever 78. To effect fine adjustment of the head 30, the knob 104 is turned to lock the sleeves 86 and 93 against relative axial movement. Thereafter, the hand wheel 84 may be turned in either direction and effects rotation of the outer sleeve 93 by means of key 94 and keyway 95. Since the outer sleeve 93 is now locked against axial movement with respect to the inner sleeve 86, the nut 97 is caused to move along the length of the screw thread 96 and carries the saddle 25 and head 30 with it. After a particular grinding operation has been completed, the knob 104 may be turned to unlock the sleeves 86 and 93 and permit rapid movement of the saddle and head under operation of the lever 78.

To permit slow feeding operation of the saddle 25 and head 30 from the hand wheel 85 at the rear end of the machine, a shaft 108 extends transversely of the machine and has a pinion 109 attached thereto. The pinion 109 is adapted to have meshing engagement with the pinion 92 and provides for rotating the sleeve 86 upon rotation of the shaft 108. The shaft 108 is provided with a forwardly extending end 110 of reduced cross-section, which is rotatably mounted in a bearing 111 carried by a cap 112 positioned within the plate member 87. The opposite end of the shaft 108 is journaled within a bearing 113 attached to a strap 114, Figs. 5 and 7, depending downwardly from the plate member 26 of the saddle 25.

The bearing member 113 is of a construction generally similar to the bearing member 62 and comprises a sleeve 115 which is rotatably mounted within the bearing member 113 by suitable bearing means and to which the hand wheel 85 is fixedly attached. A collar 116, which may be attached to the sleeve 115 by a set screw or the like, provides for maintaining the sleeve 115 against axial movement within the bearing 113. The rear end of the shaft 108 is slidably but non-rotatably mounted within the sleeve 115 by means of a key 117 attached to the sleeve 115 and operating within an elongated keyway 118 provided in the shaft 108. The shaft 108 is thus adapted to be turned by operation of the hand wheel 85 but is free to slide within the sleeve 115 upon rearward and forward movement of the saddle 25.

A means is provided, however, for disconnecting the shaft 108 and the hand wheel 85 when it is desired to operate the slow speed feed mechanism from only the forward side of the machine. To this end, the forwardly extending end 110 of the shaft 108 is provided with an internal bore within which a spring 119 is compressed by the cap member 112. A circular member 120 is rotatably mounted on the machine and carries a pin 121 adapted to engage against the gear 109. A handle 122 is attached to the rotatable member 120 and provides for rotating the member 120 to compress the spring 119 and move the gear 109 out of engagement with the gear 92. Upon movement of the handle 122 in the opposite direction, the gears 109 and 92 are again brought into intermeshing engagement.

An adjustable stop means is also provided for limiting rapid forward movement of the saddle 25 and head 30 under operation of the hand lever 78. After the rapid forward travel of the saddle has been arrested, this stop means is readily releasable to permit fine adjustment of the saddle and head by the screw 96 and hand wheels 84 and 85. The means for readily releasing the stop means also provides for rendering the stop inoperative when it is desired to permit full travel of the saddle under operation of the lever 78.

Referring to Figs. 1, 6 and 8, a plate 123 is attached to the side flange 27 of the saddle 25 and is provided with a T-shaped slot 124 within which a bolt, comprising a head 125 and an outwardly extending stem portion 126, is slidably mounted. This bolt carries a plate member 127 provided with an outwardly extending stop arm 128 and is adapted to be clamped in any desired adjusted position along the length of the plate 123 by means of a nut 129.

A hollow sleeve member 130 is rotatably mounted within the side wall 14 of the bed plate 13 and within a portion 11 of the frame 10. A rod 131 extends through the bore of the sleeve 130 and is rotatably mounted therein by means of bearings 132 and 133. An operating knob 134 is attached to the outer end of the rod 131, and a collar 135 provides for maintaining the rod 131 against axial movement within the sleeve 130. The rod 131 extends rearwardly beyond the collar 135 and is provided with a screw-threaded portion 136 which has threaded engagement with a member 137 positioned within the hollow bore of the sleeve 130 at the rearward end thereof. The member 137 is slidably but non-rotatably mounted within the bore of the sleeve 130 by means of a suitable key attached to the sleeve 130 and operating within an elongated keyway 138 provided in the member 137.

The member 137 carries a finger 139 which normally extends upwardly and engages the stop arm 128 on the saddle 25 to limit forward movement of the saddle under action of the lever 78. The position at which the saddle is stopped during its rapid forward movement is readily adjusted within limits by turning the knob 134 to effect forward or rearward movement of the member 137 and the finger 139. Further adjustment is accomplished by varying the position of the stop arm 128 in the plate 123, as hereinabove described. A collar 140 attached to the sleeve 130 by a set screw or the like provides for limiting axial movement of the sleeve 130.

As above described, the sleeve 130 is rotatably mounted in the wall 14 and frame portion 11, and rotation of this sleeve is utilized to move the stop finger 139 into and out of a released or inoperative position with respect to the stop finger 128. Rotation of the sleeve 130 is effected by a collar 141 which is attached to the sleeve 130, as by means of the set screw 142, and is provided with an operating handle 143. Thus upon rotation of the collar 141 by the handle 143 in a counterclockwise direction, as viewed in Fig. 4, the sleeve 130 is caused to rotate to move the finger 139 to a lower position out of operative relationship with the finger 128. Moving the handle 143 in the opposite direction returns the finger 139 into operative position with respect to the finger 128. The stop means is thus readily rendered inoperative either to release the stops to provide for slow speed adjustment after the rapid forward travel of the saddle 25 and head 30 has been arrested, or to permit rapid movement of the saddle throughout its path of movement.

Each of the hand wheels 59, 60, 84 and 85 has a scale and an index marker associated therewith. As best shown in Fig. 6, a scale 144 is marked on the periphery of the several hand wheels and the index marker 145 is carried by an adjustable finger 146. Each of the fingers 146 is generally the same in construction and comprises a collar 147 rotatably mounted on a sleeve portion of the bearing supporting the several hand wheels. A member 148 extends radially outwardly from the collar 147 and carries the finger 146 having the index 145 marked thereon. The index fingers 146 are thus rotatably mounted on fixed bearings and are adapted to be locked in adjusted position thereon by set screws 149 having an operating knob 150 attached to the outer ends thereof. The set screws 149, while shown generally as extending through the members 148, may be positioned in any desired portion of the collars 147.

A grinding machine is thus provided which is universal in operation and provides for effecting any desired grinding operation upon work material carried by the work holder 19 and the reciprocal work table 16. The head 30 and shaft 31 are adapted to receive any desired type of grinding wheels thereon and are readily adjusted as to both vertical and axial position by means of the hand wheels 59 and 60 and the plurality of concentric cylindrical members 34, 35 and 37.

Suitable means such as a hand wheel 21 provides for reciprocally moving the work table 16 and work holder 19 along the bed plate 18, and feeding movement of the saddle 25 and head 30 towards and away from the work table 16 is rapidly and simply effected by the hand lever 78. Slow and accurate adjusting movement of the saddle 25 and head 30 transversely of the work table 16 is effected by means of the co-operating screw members 96 and 97. A simple means comprising the knob 104 provides for disconnecting the slow feed mechanism from the saddle 25 and head 30 when it is desired to operate these latter members at a rapid speed by means of the handle 78.

Operation of the vertically adjusting means for the head 30, the means for rapidly moving the saddle 25 and head 30 toward and away from the work material on the table 16, and the means for effecting slow adjusting movement of the saddle and head, can be effected from either side and end of the machine at the convenience of the operator. The means for effecting slow feeding movement of the head 30 from the rear side of the machine may be readily disconnected when it is desired to operate such feeding means solely from the front end of the machine. The entire drive means for the head 30 and shaft 31 is carried by the movable saddle 25 and provides, as above described, for both vertical and rotational adjusting movement of the head 30 with respect to the saddle 25.

An adjustable stop means is provided for limiting the forward travel of the saddle 25 and head 30 under operation of the lever 78. This stop means is simply and readily released or rendered inoperative by a handle member 143 to permit slow speed adjustment of the saddle 25 and head 30 after rapid movement thereof has been arrested, or to permit full travel of the saddle and head at a rapid speed under operation of the lever 78.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A machine tool of the character described comprising a frame, a table for supporting work material mounted on said frame, a supporting member slidably mounted on said frame for movement transversely of said work supporting table, a tool support mounted on said supporting member for movement therewith, a shaft extending longitudinally of the frame adjacent its forward side, a sprocket mounted on said shaft, a second sprocket mounted on the frame adjacent a rear portion thereof, a chain interconnecting said sprockets, means connecting said chain to said supporting member to effect rapid movement of the member upon movement of the chain, means on said shaft at one end of the frame and means attached to said second sprocket at the opposite end of the frame for detachably receiving an operating lever, said lever providing for rotating said sprockets to effect rapid movement of said chain, screw means operatively connected with the supporting member for effecting slow movement of said supporting member and tool support, and means for selectively rendering said screw means operative or inoperative.

2. A machine tool of the character described comprising a frame, a table for supporting work material mounted on said frame, a supporting member slidably mounted on said frame for movement transversely of said work supporting table, a tool support mounted on said supporting member for movement therewith, means for imparting rapid transverse movement to said supporting member rapidly to feed the tool support towards and away from work material on said table, means for imparting slow feeding movement to said supporting member finely to adjust the tool support with respect to work material, means for selectively rendering said last named means operative or inoperative, stop means for limiting rapid forward movement of said supporting member and tool support, and selective means for rendering said stop means inoperative to limit forward movement of the supporting member and tool support.

3. A machine tool of the character described comprising a frame, a table for supporting work material mounted on said frame, a supporting member slidably mounted on said frame for movement transversely of said work supporting table, a tool support mounted on said supporting member for movement therewith, means for imparting rapid transverse movement to said supporting member rapidly to feed the tool support towards and away from work material on said table, means for imparting slow feeding movement to said supporting member finely to adjust the tool support with respect to work material, means for selectively rendering said last named means operative or inoperative, a pair of cooperating stop members carried by the frame and the supporting member respectively and providing for limiting rapid forward movement of said supporting member and tool support, means for adjusting the position of at least one of said stop members along the path of movement of said supporting member and tool support, and selective means for moving one of said stop members to an inoperative position with respect to the other stop member.

4. A machine tool of the character described comprising a frame, a table for supporting work material mounted on said frame, a supporting member slidably mounted on said frame for movement transversely of said work supporting table, a tool support mounted on said supporting member for movement therewith, means for imparting rapid transverse movement to said supporting member rapidly to feed the tool support towards and away from work material on said table, means for imparting slow feeding movement to said supporting member finely to adjust the tool support with respect to work material, means for selectively rendering said last named means operative or inoperative, a stop member adjustably carried by said supporting member, a cooperating stop member adjustably carried by said frame to provide for limiting rapid forward movement of the supporting member and tool support, and means for rotating one of said stop members to a released inoperative position with respect to the other stop member.

5. A machine tool of the character described comprising a frame, a table for supporting work material mounted on said frame, a supporting member slidably mounted on said frame for movement transversely of said work supporting table, a tool support mounted on said supporting member for movement therewith, means for imparting rapid transverse movement to said supporting member rapidly to feed the tool support towards and away from work material on said table, means for imparting slow feeding movement to said supporting member finely to adjust the tool support with respect to work material, means for selectively rendering said last named means operative or inoperative, a stop member carried by said supporting member, a cooperating stop member carried by said frame to provide for limiting rapid forward movement of the supporting member and tool support, means operable from one side of said frame for rotating said stop member carried by the frame to a released inoperative position with respect to said other stop member, and means cooperating with said last named means and operable from said side of the frame for adjusting the position of said stop member carried by the frame along the path of movement of said supporting member and tool support.

6. In a machine of the character described, a work support, a head mounted for movement towards and away from said work support, means for effecting said movement of said head, and means for selectively limiting forward travel of said head comprising a rotatively mounted hollow sleeve, a stop member slidably mounted in said sleeve, a splined connection between said stop member and said sleeve, means extending through the hollow bore of said sleeve for adjusting the position of said stop member, and means for rotating said sleeve to move said stop member to a released inoperative position.

7. In a machine of the character described, a work support, a head mounted for movement towards and away from said work support, means for effecting said movement of said head, and means for selectively limiting forward travel of said head comprising a rotatively mounted hollow sleeve, a stop member slidably mounted in said sleeve, a splined connection between said stop member and said sleeve, a shaft rotatably mounted within the hollow bore of said sleeve, a screw threaded connection between said shaft and said stop member to adjust the position of the stop member upon rotation of said shaft, means for rotating said shaft, and means for rotating said sleeve to move said stop member to a released inoperative position.

8. In a machine of the character described, a work support, a head mounted for movement towards and away from said work support, and means operatively connected with the head for effecting movement of said head comprising a rotatable sleeve, a screw threaded sleeve slidably mounted on said first named sleeve, means providing a splined connection between said first and second sleeves, and means for selectively locking together and unlocking said first and second named sleeves.

9. In a machine of the character described, a work support, a head mounted for movement towards and away from said work support, and means for effecting movement of said head comprising a rotatable sleeve, a screw threaded sleeve slidably mounted on said first named sleeve, means providing a splined connection between said first and second sleeves, means for selectively locking together and unlocking said first and second named sleeves, and a nut fixedly connected to said head and having screw threaded engagement with said second sleeve.

10. In a machine of the character described, a work support, a head mounted for movement towards and away from said work support, and means operatively connected with the head for effecting movement of said head comprising a rotatable sleeve, handle means for rotating said sleeve, a screw threaded sleeve slidably mounted on said first named sleeve, means providing a splined connection between said first and second sleeves, a cam member for selectively locking together and unlocking said first and second named sleeves, a shaft rotatably mounted in a hollow bore of said first named sleeve and having operative connection with said cam member, and means for selectively rotating said shaft to effect locking and unlocking of said sleeves by said cam member.

11. In a machine of the character described, a work support, a head mounted for movement towards and away from said work support, and means operatively connected with the head for effecting movement of said head comprising a rotatable sleeve, handle means for rotating said sleeve, a screw threaded sleeve slidably mounted on said first named sleeve, means providing a splined connection between said first and second sleeves, the inner end of said first sleeve being notched to provide a plurality of resilient fingers, a wedge shaped cam member engageable with said resilient fingers and providing for locking together and unlocking said first and second named sleeves, a shaft rotatably mounted in the hollow bore of said first named sleeve and having operative screw threaded engagement with said cam member to cause locking and unlocking movement of the cam member, and means for selectively rotating said shaft to effect locking and unlocking of said sleeves by said cam member.

12. In a machine of the character described, a work support, a head mounted for movement towards and away from said work support, and means operatively connected with the head for effecting movement of said head comprising a rotatable sleeve, a screw threaded sleeve slidably mounted on said first named sleeve, means providing a splined connection between said first and second sleeves, means for selectively locking together and unlocking said first and second named sleeves, a hand wheel attached to said first sleeve at one side of the machine and providing for rotating said sleeve, a second hand wheel positioned at the opposite side of the machine, a gear attached to said first sleeve for also effecting rotation of the sleeve, a shaft extending transversely of the machine and having a splined connection with said second hand wheel, a gear attached to said shaft and adapted to mesh with said first named gear to cause rotation of the first named sleeve upon rotation of the shaft by said second hand wheel, and means for effecting axial movement of said shaft selectively to cause meshing engagement of said gears or disengagement thereof.

13. In a machine tool having a frame and a reciprocable carriage, a transmission for said carriage comprising a shaft extending longitudinally with respect to the frame, a sprocket mounted on said shaft, a second sprocket mounted upon the frame and spaced from the first sprocket, an endless chain interconnecting said sprockets, and means connecting said chain with said reciprocable carriage whereby the carriage will be moved upon movement of the chain, and an operating lever upon said shaft adapted to rotate said sprockets to effect a movement of said chain.

14. In a machine tool having a frame, a reciprocable carriage, a rapid traverse transmission for imparting rapid traverse movement to said carriage, and a feeding transmission for imparting feeding movement to said carriage, a positive stop for limiting the rapid traverse movement of said reciprocable carriage, and selective means for rendering said positive stop inoperative to permit a continued feeding movement of said reciprocable carriage.

15. In a machine tool having a frame, a reciprocable carriage, a rapid traverse transmission for imparting rapid traverse movement to said carriage, and a feeding transmission for imparting feeding movement to said carriage, a positive stop adjustably carried by said reciprocable carriage, a second positive stop adjustably carried by the frame, said positive stops cooperating to limit the rapid traverse movement of the reciprocable carriage, and means for rotating at least one of said positive stops to a released inoperative position with respect to the other positive stop.

16. In a machine tool having a frame, a reciprocable carriage, a rapid traverse transmission for imparting rapid traverse movement to said carriage, and a feeding transmission for imparting feeding movement to said carriage, a positive stop carried by said reciprocable carriage, and a second positive stop carried by said frame, said positive stops cooperating to limit the rapid traverse movement of the reciprocable carriage, mechanism operable from one side of the frame for rotating the positive stop carried by the frame to a released inoperative position with respect to the other stop, and means cooperating with said mechanism and operable from the side of the frame for adjusting the position of said positive stop carried by the frame along the path of movement of the reciprocable carriage.

17. In a machine of the character described having a reciprocable carriage, means for selectively limiting the forward travel of said carriage comprising a rotatably mounted hollow sleeve, a stop member slidably mounted in said sleeve, a splined connection between said stop member and said sleeve, means extending through the hollow bore of said sleeve for adjusting the position of said stop member, and means for rotating said sleeve to move said stop member to a released inoperative position.

18. In a machine of the character described having a reciprocable carriage, means for selectively limiting forward travel of said carriage comprising a rotatably mounted hollow sleeve, a stop member slidably mounted in said sleeve, a splined connection between said stop member and said sleeve, a shaft rotatably mounted within the bore of said hollow sleeve, a screw threaded connection between said shaft and said stop member to adjust the position of the stop member upon rotation of said shaft, means for rotating said shaft, and means for rotating said sleeve to move said stop member to a released inoperative position.

19. In a machine tool having a reciprocable carriage, a transmission for moving said carriage comprising a rotatable sleeve, a screw threaded sleeve slidably mounted on said first named sleeve, means providing a splined connection between said first and second sleeves, and means for selectively locking together and unlocking said first and second named sleeves.

20. In a machine tool having a reciprocable carriage, a transmission for moving said carriage comprising a rotatable sleeve, a screw threaded sleeve slidably mounted upon said first mentioned sleeve, means providing a splined connection between said first and second sleeves, means for selectively locking together and unlocking said first and second sleeves, and a nut fixedly connected to said reciprocable carriage and having a screw threaded engagement with said second sleeve.

21. In a machine tool having a reciprocable carriage, a transmission for moving said carriage comprising a rotatable sleeve, handle means for rotating said sleeve, a screw threaded sleeve slidably mounted on said first sleeve, means providing a splined connection between said first and second sleeves, a cam member for selectively locking together and unlocking said first and second sleeves, a shaft rotatably mounted in a hollow bore of said first sleeve and having operative connection with said cam member, and means for selectively rotating said shaft to effect locking and unlocking of said sleeves by said cam member.

22. In a machine tool having a reciprocable carriage, means for effecting movement of said carriage comprising a rotatable sleeve, handle means for rotating said sleeve, a screw threaded sleeve slidably mounted on said first named sleeve, means providing a splined connection between said first and second sleeves, the inner end of said first sleeve being notched to provide a plurality of resilient fingers, a wedge shaped cam member engageable with said resilient fingers and providing for locking together and unlocking said first and second named sleeves, a shaft rotatably mounted in the hollow bore of said first named sleeve and having operative screw threaded engagement with said cam member to cause locking and unlocking movement of the cam member, and means for selectively rotating said shaft to effect locking and unlocking of said sleeves by said cam member.

23. In a machine tool having a reciprocable carriage, a transmission for moving said carriage comprising a rotatable sleeve, a screw threaded sleeve slidably mounted on said first named sleeve, means providing a splined connection between said first and second sleeves, means for selectively locking together and unlocking said first and second named sleeves, a hand wheel attached to said first sleeve at one side of the machine and providing for rotating said sleeve, a second hand wheel positioned at the opposite side of the machine, a gear attached to said first sleeve for also effecting rotation of the sleeve, a shaft extending transversely of the machine and having a splined connection with said second hand wheel, a gear attached to said shaft and adapted to mesh with said first named gear to cause rotation of the first named sleeve upon rotation of the shaft by said second hand wheel, and means for effecting axial movement of said shaft selectively to cause meshing engagement of said gears or disengagement thereof.

24. In a machine tool having a reciprocable carriage, a rapid traverse transmission operatively connected to said carriage, said transmission comprising a turnable driving member and a flexible transmission member drivingly engaging said driving member and connected to said carriage, an independent slow feed transmission operatively connected to said carriage, and means for disconnecting the slow feed transmission from the carriage to permit movement of said carriage by said rapid traverse transmission.

25. In a machine tool having a reciprocable carriage, a rapid traverse transmission, operatively connected with said carriage and comprising a sprocket and chain drive, an independent slow feed transmission operatively connected with said carriage and comprising a screw and nut drive, and means for disconnecting said slow feed transmission from said reciprocable carriage to permit movement of said carriage by said rapid traverse transmission.

GUSTAF ERIKSON.
EDDIE CHRISTIAN FILSTRUP.

REFERENCES CITED

The following references are of record in the file of this patent:

UNITED STATES PATENTS

| Number | Name | Date |
| --- | --- | --- |
| 2,190,134 | Garside et al. | Feb. 13, 1940 |
| 1,584,339 | Wernecke | May 11, 1926 |
| 2,116,794 | La Fleur | May 10, 1938 |
| 1,788,475 | Van Norman | Jan. 13, 1941 |
| 1,881,984 | Van Norman | Oct. 11, 1932 |
| 2,101,787 | Amidon | Dec. 7, 1937 |
| 2,239,639 | Amidon | Apr. 22, 1941 |
| 725,085 | Jacob | Apr. 14, 1903 |
| 1,850,392 | Haas | Mar. 22, 1932 |